United States Patent [19]

Meyer et al.

[11] Patent Number: 4,588,809
[45] Date of Patent: May 13, 1986

[54] PROCESS FOR ISOLATING PULVERULENT CHLORINATED ALIPHATIC POLYMERS FROM THEIR ALIPHATIC CHLOROHYDROCARBON SOLUTIONS

[75] Inventors: Karl-Heinrich Meyer, Krefeld; Diez Heine, Leverkusen; Franz Alfes, Krefeld; Wolfgang Eisermann, Duesseldorf, all of Fed. Rep. of Germany

[73] Assignee: Bayer Aktiengesellschaft, Leverkusen, Fed. Rep. of Germany

[21] Appl. No.: 672,463

[22] Filed: Nov. 19, 1984

[30] Foreign Application Priority Data

Nov. 30, 1983 [DE] Fed. Rep. of Germany ....... 3343322

[51] Int. Cl.$^4$ ................................................ C08F 6/12
[52] U.S. Cl. ..................................... 528/500; 528/497
[58] Field of Search ............................. 528/500, 497

[56] References Cited

U.S. PATENT DOCUMENTS 4,122,249 10/1978 Padget ................................ 528/486
4,144,203 3/1979 Hoehne et al. ................. 528/500 X
4,381,392 4/1983 Pontoglio ......................... 528/483 X
4,430,483 2/1984 Alfes et al. ...................... 528/500 X

FOREIGN PATENT DOCUMENTS 784601 5/1968 Canada .
520371 8/1976 U.S.S.R. .............................. 528/500

Primary Examiner—Paul R. Michl
Attorney, Agent, or Firm—Connolly and Hutz

[57] ABSTRACT

The invention relates to an improved process for isolating pulverulent chlorinated aliphatic polymers from their aliphatic chlorohydrocarbon solutions by introducing a mixture of steam and special solvent into said solutions, removing the aliphatic chlorohydrocarbon by steam distillation, and isolating the chlorinated polymer in the customary manner as a solid.

The process produces a product which is practically free ($\leq 20$ ppm) of toxic aliphatic chlorohydrocarbons and can be safely used in paints, adhesives or printing inks.

8 Claims, No Drawings

PROCESS FOR ISOLATING PULVERULENT CHLORINATED ALIPHATIC POLYMERS FROM THEIR ALIPHATIC CHLOROHYDROCARBON SOLUTIONS

The invention relates to an improved process for isolating pulverulent chlorinated aliphatic polymers from their aliphatic chlorohydrocarbon solutions. The process produces a product which is practically free ($\leq 20$ ppm) of toxic aliphatic chlorohydrocarbons and can be safely used in paints, adhesives or printing inks.

It is known to chlorinate aliphatic polymers, such as natural rubber, polyisoprene, polybutadiene, polyethylene, polypropylene and polyethylenepropylene copolymers up to chlorine contents of 30 to 70% by weight by passing gaseous chlorine at 60° to 120° C. into a solution of the polymer in an aliphatic chlorohydrocarbon. The preferred solvent is carbon tetrachloride, which, although highly suitable owing to its high chlorine resistance, requires special precautions on ecological grounds. The polymer can be recovered in the form of a solid from the solution of the polymer in the chlorine-resistant organic solvent at the end of the chlorination by treating the mixture with hot water or steam. In the course of this treatment, a portion of the organic solvent used will distill off, and the chlorinated polymer precipitates and can be filtered off. The primary product obtained then contains about 30 to 60% by weight of water, in addition to considerable residual amounts of the organic solvent. Not even drying this product in vacuo or in a gas stream can completely remove the organic solvent, for example 5 to 10 parts by weight of organic solvent remaining behind per 100 parts by weight of the chlorinated polymer (cf. German Offenlegungsschrift No. 2,359,461=U.S. Patent Specification No. 4,144,203).

If they are to be used as paints the chlorinated polymers are dissolved in a conventional paint-solvent, for example toluene; the still present residual amounts of the aliphatic chlorohydrocarbons used for the chlorination will also pass into the solution and will evaporate in the course of the application of the paint. In order to avoid this, the residual content of the solvent used for the chlorination in the chlorinated polymers used for painting has to be reduced. The same applies to the use in printing inks or adhesives.

It is also known (cf. German Offenlegungsschrift No. 2,701,288=U.S. Patent Specification No. 4,122,249), in treating the solution of the chlorinated polymer in the chlorine-resistant organic solvent with hot water or steam, to add to the solution a small amount by weight of an aliphatic alcohol having at least 8, preferably 12, carbon atoms, in order to reduce to 0.1 to 3.1% by weight the residual content of the aliphatic chlorohydrocarbon used for the chlorination in the chlorinated polymer. However, this method has the disadvantage that the precipitated product tends to adhere to the walls of the vessel where the precipitation takes place. Moreover, a further reduction in the residual solvent content would appear to be desirable.

Lower solvent contents are obtained (cf. German Offenlegungsschrift No. 2,818,647=U.S. Patent Specification No. 4,172,104) if the solution of the chlorinated polymer in the aliphatic chlorohydrocarbon is treated with hot water or steam in the presence of a small amount by weight of a product obtained by oxyethylating one mole of a primary aliphatic monoalcohol having at least 8 carbon atoms with 2-20 moles of ethylene oxide, the result being paint films which are less resistant to water than corresponding films of chlorinated polymers without additives are. The residual aliphatic chlorohydrocarbon content, for example carbon tetrachloride content, is said to be reducible by this method to $\leq 0.1\%$ by weight.

The auxiliaries added to the aliphatic chlorohydrocarbon solutions of the aliphatic chlorinated polymer in order to reduce the residual solvent content substantially remain in the chlorinated polymer even after the working-up and are responsible for an undesirable lowering of the softening point of the chlorinated polymer.

In the process of French Patent Specification No. 1,424,790 (=Canadian Patent Specification No. 784,601), concentrated solutions of chlorinated aliphatic polymers in aromatic hydrocarbons (for example toluene), high-boiling carboxylic acid esters and ketones are prepared to be, it is said, free of moisture and impurities by, as shown in the Examples, mixing 100 parts by weight of 10% by weight strength carbon tetrachloride solutions of the chlorinated aliphatic polymer with 40 to 100 parts by weight of one of the abovementioned chlorine-free solvents having a higher boiling point than carbon tetrachloride, and distilling off the carbon tetrachloride by means of a fractionation column. However, the process has a number of serious defects.

The solutions of the chlorinated aliphatic polymer which are thus redissolved in CCl$_4$-free solvents tend to more pronounced discolouration and, if used as underwater paints, have a marked tendency to sub-coat migration due to corrosion of the substrate surfaces (see comparative example).

It is the object of the present invention to provide an economical, industrially feasible, reproducible process for isolating pulverulent chlorinated aliphatic polymers from their aliphatic chlorohydrocarbon solutions. The pulverulent chlorinated polymers should be practically free ($\leq 20$ ppm) of aliphatic chlorohydrocarbons and free of additives for reducing the chlorohydrocarbon content. Moreover, if used as a binder in coating agents, adhesives and printing inks, the chlorinated aliphatic polymer should not lose any corrosion-causing components which could damage the substrates.

This object is achieved by means of the process according to the invention, which is detailed below in the definition of the invention.

The invention thus provides a process for isolating pulverulent chlorinated aliphatic polymers from their aliphatic chlorohydrocarbon solutions by removing the aliphatic chlorohydrocarbon by means of steam distillation and by separating the precipitated chlorinated aliphatic polymer from the aqueous phase and drying, characterised in that a mixture of 10 to 30% by weight of steam and 90 to 70% by weight of an organic solvent A if desired in vapour form—said organic solvent A being a solvent for the chlorinated aliphatic polymer, containing no aliphatically bonded halogen and having a higher boiling point than the aliphatic chlorohydrocarbon has—is introduced into the aliphatic chlorohydrocarbon solution of the chlorinated aliphatic polymer, the aliphatic chlorohydrocarbon is removed by steam distillation together with an azeotropic water content, the resulting 70 to 90 percent by weight strength aqueous dispersion of the chlorinated aliphatic polymer dissolved in solvent A is introduced in conventional manner into a coagulation bath of boiling water, solvent A is removed by steam distillation and the coagulated chlorinated aliphatic polymer is isolated and dried.

The chlorinated aliphatic polymers having chlorine contents of about 30 to 70% by weight are prepared in aliphatic chlorohydrocarbons by known processes, for example as described in German Offenlegungsschrift No. 2,359,461.

Examples of suitable aliphatic polymers for the chlorination are natural rubber, polyisoprene, polybutadiene, polyethylene, polypropylene, ethylene/propylene copolymers and their mixtures.

Aliphatic chlorohydrocarbons are to be understood as meaning, for example, carbon tetrachloride, trichloroethylene, chloroform, 1,2-dichloroethane, tetrachloroethane or methylene chloride, preferably carbon tetrachloride.

Examples of solvents A suitable for the process according to the invention are toluene, xylene, chlorobenzene, butyl acetate and solvent naphtha, toluene being preferred.

The aliphatic chlorohydrocarbons to be used according to the invention and the solvents A to be used each form a binary azeotropic vapour phase mixture with water. For the process of the invention to be feasible, the boiling point of the azeotrope of aliphatic chlorohydrocarbon and water always has to be lower than the boiling point of the azeotrope of solvent A and water.

The concentrations at which the chlorinated aliphatic polymers are used in the aliphatic chlorohydrocarbons for the process according to the invention are not critical, but the solids content is preferably 5 to 30% by weight.

The vapour mixture of solvent A and water which is to be used for the process according to the invention can differ very widely in its composition, but its steam content is advantageously between 10 and 30% by weight. It is also possible to add the solvent A in liquid form, since the steam which is blown in always has the effect of producing an azeotropic vapour mixture with the solvent A.

The process according to the invention can be carried out in batchwise form in a stirred vessel fitted with a rectifying column or—particularly advantageously—in continuous form in a stripping column charged from above with the optionally stabilised solution of the chlorinated polymer in an aliphatic chlorohydrocarbon and from below with a mixture of steam and the replacement solvent passed in upwardly in countercurrent.

In order to avoid eliminated hydrogen chloride corroding working-up ranges made of corrodable metals, it is advantageous to emulsify the solution of the chlorinated polymer in the aliphatic chlorohydrocarbon which is obtained in the course of the chlorination with a certain amount of an aqueous alkali metal hydroxide solution or alkali metal carbonate solution even before the hot water precipitation. An addition of 1 to 5% by weight, relative to the weight of the solution of the chlorinated polymers in the aliphatic chlorohydrocarbon, of a 2 to 10% strength sodium carbonate solution to a 5 to 30% by weight strength solution of chlorinated aliphatic polymers in the aliphatic chlorohydrocarbon will normally prove sufficient for this purpose. The stabilising measure described above can of course also be taken if the process is carried out in non-corrodable apparatus.

The vapour mixture obtained on precipitating the chlorinated polymer from its solution in solvent A by treating the solution with boiling water, which vapour mixture consists of water and solvent A, can, to save energy, be directly reused in the process according to the invention. The percentages given in the Example and in the Comparative Experiment are by weight.

EXAMPLE 2,145 g/h of a 20% strength solution of chlorinated rubber (chlorine content about 67%, cis-1,4-polyisoprene) in carbon tetrachloride were metered from above in a packed column (made of glass) having 25 theoretical plates (a laboratory column having an internal diameter of 35 mm), while a toluene-steam mixture of 1,300 g/h of toluene and 380 g/h of steam was passed into the bottom part of the column.

The bottom product, continuously discharged, was 2,065 g/h of an aqueous emulsion consisting of a 25% strength Pergut-toluene solution and about 16% of water, while the top product which distilled off was 1,716 g/h of carbon tetrachloride together with 75 g/h of water.

By repeated multihour experiments (each of 6 hours) it was possible to demonstrate the reproducibility and the virtually complete solvent exchange, as the following table shows:

| Experi-ment No. | Temperature measuring sites (°C.) | | | | $CCl_4$ content in the bottom product | Toluene content in the distillate |
| --- | --- | --- | --- | --- | --- | --- |
|  | 1 | 2 | 3 | 4 |  |  |
| 1 | 84.5 | 69.1 | 67.5 | 66.1 | 100 ppm | ≦10 ppm |
| 2 | 84.3 | 68.8 | 67.2 | 66.0 | 70 ppm | ≦10 ppm |
| 3 | 84.4 | 69.0 | 66.9 | 65.9 | 300 ppm | ≦10 ppm |
| 4 | 84.5 | 68.5 | 67.1 | 66.0 | 150 ppm | ≦10 ppm |
| 5 | 84.5 | 68.6 | 67.2 | 66.0 | 100 ppm | ≦10 ppm |

The temperature measuring sites in the column were as follows:
Measuring site 1—Bottom of the column
Measuring site 2—Bottom third of the column
Measuring site 3—Upper third of the column
Measuring site 4—Top of the column The dispersions obtained as the bottom product were simply precipitated by stirring them into boiling water and boiling the mixture until the distillate was free of toluene. The precipitated powder/granules mixture was then filtered off and was dried under 30 mbar at 95° C. for 24 hours. On analysis, the chlorinated rubber thus obtained was found to contain no (≦20 ppm) carbon tetrachloride.

Comparative experiment

Analogously to the process mentioned in Example 1 of French Pat. No. 1,424,790, the apparatus described in Example 1 of the present application was charged from above for 6 hours with 2,145 g/h of a 20% strength solution of the same chlororubber type (chlorine content about 67%, cis-1,4-polyisoprene) in carbon tetrachloride, while 1,300 g/h of anhydrous toluene vapour were passed into the column at the bottom. The temperatures at the bottom of the column were measured as between 114° and 115° C., while the distillate (predominantly carbon tetrachloride) passed over at 77° to 78° C.

4 samples each of the top and bottom products were analysed at regular intervals within the abovementioned 6 hours:

| Samples No. | 1 | 2 | 3 | 4 |
|---|---|---|---|---|
| Distillate: toluene content | 0.54% | 2.1% | 0.92% | 1.6% |
| Bottom: CCl$_4$ content | 430 ppm | 320 ppm | 390 ppm | 350 ppm |
| Bottom: toluene content | 24.9% | 25.4% | 25.0% | 25.2% |

Comparison of the products of Example 1 with the products of the comparative experiment 20% strength solutions (A) in toluene were prepared from the powder/granules mixture prepared in Example 1 by precipitation.

Likewise 20% strength solutions (B) in toluene were prepared from the bottom product of the comparative experiment.

Comparison of the colour values and the CCl$_4$ content shows the solutions of Example 1, surprisingly, to have much better properties:

|  | Iodine colour value | CCl$_4$ content |
|---|---|---|
| Solutions (A) | 5–8 | ≦20 ppm |
| Solutions (B) | 12–15 | 240 to 350 ppm |

The difference in quality between the products is even clearer when they are tested for their application properties as paints. For this purpose, cleaned and degreased metal sheets were provided with three coats according to the following standard recipes:

| Recipe | Base coat % by weight | Intermediate coat % by weight | Top coat % by weight |
|---|---|---|---|
| 100% pure chlororubber as per Example 1 and as per comparative experiment | 10.0 | 14.5 | 15.1 |
| Plasticiser | 6.3 | 9.2 | 9.6 |
| Hydrogenated castor oil | 0.2 | 0.2 | 0.2 |
| Toluene | 32.3 | 35.1 | 38.7 |
| Red lead oxide | 36.2 | — | — |
| Pigments and fillers | 8.6 | 31.0 | 36.4 |
| Plastorit | 2.0 | 2.7 | — |
| Talcum | 4.4 | 7.3 | — |
| Total | 100.0 | 100.0 | 100.0 |

The coated metal sheets were scored in accordance with DIN 53,167 with a scratch through to the metal base and were stored at room temperature in a 5% strength sodium chloride solution. 24 days later the sub-coat migration (delamination) of the paint film was measured:

| Coating material | Sub-coat migration after 24 days |
|---|---|
| With chlororubber as per Example 1 | 0 to 1 mm |
| With chlororubber as per comparative experiment | 10 to 12 mm |

The result shows that the chlororubber as per Example 1 is highly suitable for use in underwater paints, while the chlororubber as per the comparative experiment is unsuitable for underwater paints.

We claim:

1. A process for isolating pulverulent chlorinated aliphatic polymers from their aliphatic chlorohydrocarbon solutions wherein a mixture of 10 to 30% by weight of steam and 90 to 70% by weight of an organic solvent A is introduced into the aliphatic chlorohydrocarbon solution of the chlorinated aliphatic polymer, the aliphatic chlorohydrocarbon is removed by steam distillation together with an azeotropic water content, the resulting 70 to 90 percent by weight strength aqueous dispersion of the chlorinated aliphatic polymer dissolved in solvent A is introduced into a coagulation bath of boiling water, solvent A is removed by steam distillation and the coagulated chlorinated aliphatic polymer is isolated and dried,
    wherein said organic solvent A is a solvent for the chlorinated aliphatic polymer, contains no aliphatically bonded halogen, has a higher boiling point than the aliphatic chlorohydrocarbon and which forms a binary azeotrope with water.

2. A process according to claim 1, in which the aliphatic chlorohydrocarbon is carbon tetrachloride.

3. A process according to claim 1, in which that solvent A is toluene.

4. A process according to claim 1, in which the aliphatic chlorohydrocarbon solution of the chlorinated aliphatic polymer is continuously introduced into the upper part of a countercurrent column, the mixture of steam and solvent A is continuously passed in at the bottom, and the azeotropic mixture of aliphatic chlorohydrocarbon and water is continuously discharged at the top of the column while the aqueous dispersion of the chlorinated aliphatic polymer dissolved in solvent A is continuously discharged at the very bottom of the column.

5. A process according to claim 1, in which solvent A is added to the mixture in vapour form.

6. A process according to claim 1, in which the chlorinated aliphatic polymer is a polymer obtained by the chlorination of natural rubber, polyisoprene, polybutadiene, polyethylene, polypropylene, an ethylene/propylene co-polymer or a mixture of one or more of these polymers.

7. A process according to claim 1 wherein the aliphatic chlorohydrocarbon is carbon tetrachloride, trichloroethylene, chloroform, 1,2-dichloroethane, tetrachloroethane or methylene chloride.

8. A process according to claim 1 wherein solvent A is toluene, xylene, chlorobenzene, butyl acetate or solvent naphtha.

* * * * *